US007557324B2

(12) United States Patent
Nylen et al.

(10) Patent No.: US 7,557,324 B2
(45) Date of Patent: Jul. 7, 2009

(54) BACKSTREAM-PREVENTING THERMAL SPRAYING DEVICE

(75) Inventors: Per Nylen, Trollhättan (SE); Alice Boussagol, Trollhättan (SE); Roger Svensson, Sjuntorp (SE); Gabriel Mora, Roquelaure (FR); Mats-Olov Hansson, Vargön (SE); Jan Wigren, Trollhättan (SE); Jimmy Johansson, Trollhättan (SE)

(73) Assignee: Volvo Aero Corporation, Trollhattan (SE)

( * ) Notice: Subject to any disclaimer, the term of this patent is extended or adjusted under 35 U.S.C. 154(b) by 218 days.

(21) Appl. No.: 10/605,256

(22) Filed: Sep. 18, 2003

(65) Prior Publication Data

US 2004/0129222 A1 Jul. 8, 2004

Related U.S. Application Data

(60) Provisional application No. 60/319,558, filed on Sep. 18, 2002.

(51) Int. Cl.
*B23K 10/00* (2006.01)

(52) U.S. Cl. .............................. 219/121.47; 219/121.5; 219/121.51; 219/76.16; 313/231.41

(58) Field of Classification Search ............ 219/121.47, 219/121.48, 121.45, 74, 75, 76.15, 76.16, 219/121.5, 121, 5, 121.51; 239/8–13; 313/231.31, 313/231.41

See application file for complete search history.

(56) References Cited

U.S. PATENT DOCUMENTS

| | | | | |
|---|---|---|---|---|
| 3,235,700 | A * | 2/1966 | Mondain-Monval et al. | 219/76.16 |
| 4,964,568 | A * | 10/1990 | Rotolico et al. | 239/8 |
| 5,340,023 | A * | 8/1994 | Itoh et al. | 239/13 |
| 5,406,046 | A * | 4/1995 | Landes | 219/121.47 |
| 5,408,066 | A * | 4/1995 | Trapani et al. | 219/121.47 |
| 5,858,470 | A * | 1/1999 | Bernecki et al. | 427/453 |
| 6,137,078 | A | 10/2000 | Keller | 219/121.5 |

FOREIGN PATENT DOCUMENTS

| | | | |
|---|---|---|---|
| EP | 0250308 | A1 | 12/1987 |
| EP | 0706308 | A1 | 4/1996 |
| GB | 967445 | A | 8/1964 |

* cited by examiner

*Primary Examiner*—Mark H Paschall
(74) *Attorney, Agent, or Firm*—Novak Druce + Quigg LLP

(57) ABSTRACT

A thermal spraying method and device that includes a device (1,2) which generates a flame and a device (3) which injects a powder into the flame. The flame-generating device (1,2) includes an end piece (1) out of which the flame is directed towards a substrate subjected to spraying. The powder-injection device (3) includes a frame element (6) that is adapted to be attached to the end piece (1) and to project in the flame ejection direction from the end piece (1). The frame element (6) has a plurality of through-holes (9) extending through it and distributed circumferentially about the frame element (6) as well as at least two powder injection ports distributed about the frame element (6).

16 Claims, 5 Drawing Sheets

BACKSTREAM-PREVENTING THERMAL SPRAYING DEVICE

CROSS REFERENCE TO RELATED APPLICATIONS

The present application claims the benefit of U.S. Provisional Application No. 60/319,558 filed 18 Sep. 2002.

BACKGROUND OF INVENTION

1. Technical Field

The present invention relates to thermal spraying devices that include a means for generating a flame and a means for injecting a powder into the flame. The flame-generating means includes an end piece out of which the flame is directed towards a substrate subjected to spraying. In the context of the present disclosure, the terminology of "thermal spraying device" is used to refer to devices for generating a flame that can be used for the purpose of depositing a coating of metal or ceramic onto a substrate; examples include plasma spray guns of different kinds, flame jet devices, HVOF devices and related arrangements. The technical field of the invention is particularly that of applying coatings, such as thermal barrier coatings of metal or ceramics, onto substrates, and in particular, onto substrates such as constructional elements in aerospace constructions, in particular motor parts thereof. The invention, however, is not restricted to such applications, but instead also can find a number of applications outside this relatively narrow field.

2. Background

Devices for plasma spraying a powder onto a substrate are known that comprise (include, but are not limited to) plasma jet-generating means and one or more powder injection ports via which a powder is injected into the plasma jet. An example of such a plasma jet gun is the widely used F4 Sulzer Metco gun. This product includes an end piece through which the plasma jet is directed out of the gun and towards the substrate that is to be coated. A shoulder or knob is attached to the end piece and is provided with a nozzle that accommodates the injection of powder into the plasma jet.

During operation, when the powder is injected into the plasma jet, melted and deposited onto a substrate, characteristic flow patterns are generated as the powder reaches the jet. Often, during normal operation conditions, a back-stream of powder may return to the nozzle resulting in a clogging of the nozzle. Larger particles of aggregated powder clogged in the nozzle or the end piece will sooner or later come loose and be ejected into the jet. This causes disturbances in the spraying process, resulting in blisters and lumps being generated in the coating.

SUMMARY OF INVENTION

It is an object of the present invention to present a thermal spraying device with an improved powder yield, that has an improved efficiency in comparison to comparable known devices. That is to say, device configured according to the teachings of the present invention should guarantee an equal or better result than previously known devices, while also using less powder.

It is also an object of the invention to present a thermal spraying device for which the tendency of having unfavorable back-streams of powder with a resulting clogging of the nozzles is reduced, or even eliminated.

It is a further object of the invention to obtain an improved spray-rate; that is, a reduced spray time for a given amount of powder used, with a maintained satisfactory quality of the applied coating.

Objects of the invention are achieved by means of the thermal spraying device initially described and which is characterized by a powder-injection means having a frame element that projects in the flame ejection direction from the end piece. Further, the frame element at least partly surrounds a flame zone extending from the end piece. Exemplarily, at least one-quarter, or 90 degrees of a circumference around the flame zone is surrounded by the frame portion.

Because of the surrounding nature of the frame portion, and an at least partly annular shape of the frame element, an improved flow pattern is obtained resulting in a re-markably reduced back-stream tendency. Normally, the shape and/or the dimensions of the inner periphery of the part of the frame element projecting in the direction of the flame correspond to those of the end piece of the flame-generating means. The nozzle(s), or powder port(s) is (are) located in the projecting part of the frame element, thereby directing power jets from the inner periphery of the frame element in a radial direction towards the central flame, perpendicularly to the length direction of the flame, or obliquely, but partly in the length-direction of the flame.

According to a preferred embodiment of the invention, the frame element covers at least 180 degrees, preferably at least 270 degrees, and most preferably 360 degrees of a circumference around a flame zone extending from the end piece.

In a preferred embodiment, the frame element defines a ring-shaped element and is designed as a continuous ring with a continuous inner periphery extending over and covering 360 degrees. It should be understood, however, that as an alternative, the element may be made up by two or more discrete ring parts, each defining a sector of the frame element. The discrete ring parts need not form a frame element that has a continuous inner periphery, but could as well define a discontinuous, broken ring, thereby extending over and covering at least 180 degrees, and preferably at least 270 degrees in the peripheral direction thereof. One or more of the nozzles or powder ports may be arranged between individual of such ring parts or ring segments.

Preferably, the frame element has an inner periphery, the cross section of which corresponds to the geometry of the cross section of the inner periphery of the end piece. The cross section should present rotational symmetry.

According to a preferred embodiment of the invention, at least the part of the frame element that projects beyond the end piece in the flame ejection direction comprises at least one radial, open through hole. Such holes provide air-cooling of the flame in order to stabilize the flow in the powder injection area. Apart from the openings defined by the holes on the inner periphery of the frame element and possible powder injection nozzles, the inner peripheral surface of the projecting part is generally even, presenting no projections or the like that would negatively disturb the flow pattern of the flame and injected powder.

Preferably the frame element comprises a plurality of radial, open through holes normally numbering at least six, and preferably more than ten radial open through holes. The holes should be evenly distributed around the periphery of the frame element such that uniform flow conditions are achieved completely around the central flame or jet.

According to one embodiment, the end piece has an inner width or inner diameter d and the frame element projects a distance p. The relationship between d and p is: $0.5\,d<p<2\,d$.

This is a particularly preferred relationship for end pieces with an inner diameter of six or eight mm, but also for other diameters used in practice.

When the end piece has an inner width of, or inner diameter d, and the projecting part of the frame element has an inner corresponding width or diameter D, D is equal to or larger than d, and preferably D<1.2 d. This relationship has been proven suitable at least for end pieces with an inner diameter d of six or eight mm.

According to a further preferred embodiment of the invention, two or more powder injection ports are distributed around the inner periphery of the frame element for directing a powder towards the flame. In this manner, an improved and more even powder distribution within the plasma jet is achieved. Since the injected powder is distributed via a number of nozzles, a larger amount of powder per time unit can be injected into the plasma without the instability problems that occur when only one nozzle or port is used.

Preferably, the powder injection ports are evenly distributed around the periphery of the frame element. In this way an even distribution of the powder in the plasma is promoted. Preferably, the device comprises or is connected to a means for distributing the powder evenly among the powder injectors.

According to one embodiment, each powder injection port comprises a nozzle that is inserted in a radial hole or opening through the frame element. At least one or more of the open through holes are adapted for accommodating such a nozzle therein. Accordingly, the frame element is equipped with a plurality of radial through holes, extending from the outside to the inside of the frame element and permitting any medium such as air to pass through them. At least some of the holes are adapted to accommodate a nozzle or the like therein. For example, some holes might be provided with a thread for engagement with a nozzle, resulting in a more versatile device.

The frame element should be removably attached to the end piece. For example, a part of the frame element can be adapted to be pulled onto the outer periphery of the end piece, that part of the frame element being provided with fastening screws that penetrate its wall. Any kind of clamp or the like can also be used in order to suitably fix the frame element in relation to the end piece.

According to the one embodiment of the invention, the flame generated by the flame-generating means is a plasma jet formed by letting a gas flow in an annular path between a cathode and an anode. Typically, the temperature of such a jet can reach 15,000° C. and the powder introduced into the plasma can obtain a speed of up to 500 meters per second as it is melted and accelerated by the plasma jet before hitting a substrate.

Further features and advantages of the present invention will be presented in the following detailed description representing a preferred embodiment of the disclosed inventive device.

BRIEF DESCRIPTION OF DRAWINGS

A preferred embodiment of the present invention will now be described with reference to the annexed drawings on which.

DETAILED DESCRIPTION

Figure 1:
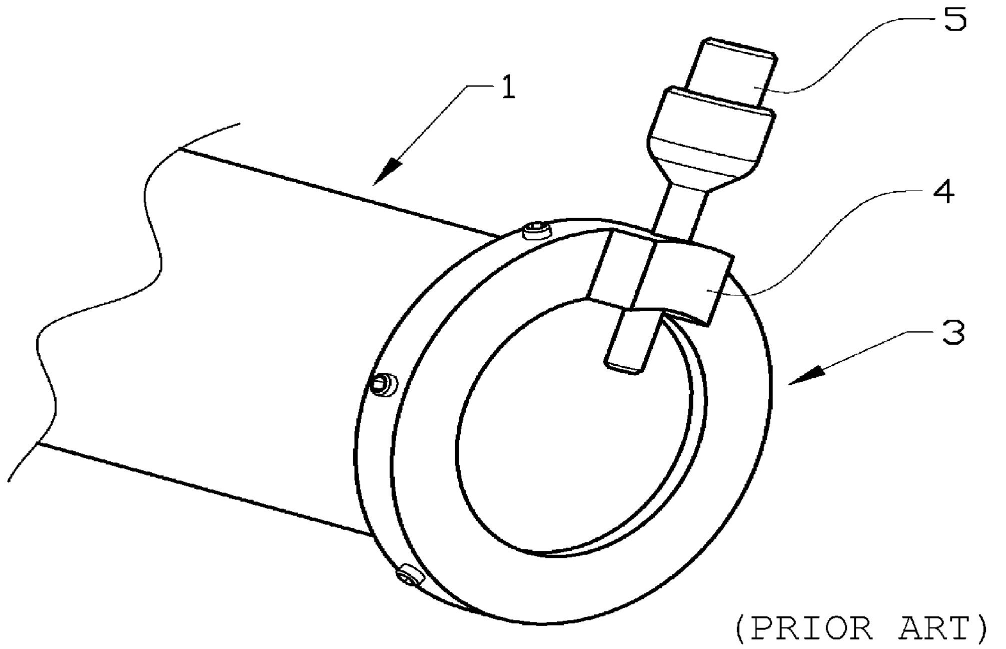
FIG. 1 is a perspective view of an end piece of a thermal spraying device provided with a previously known type of powder injection means.
Figure 2:
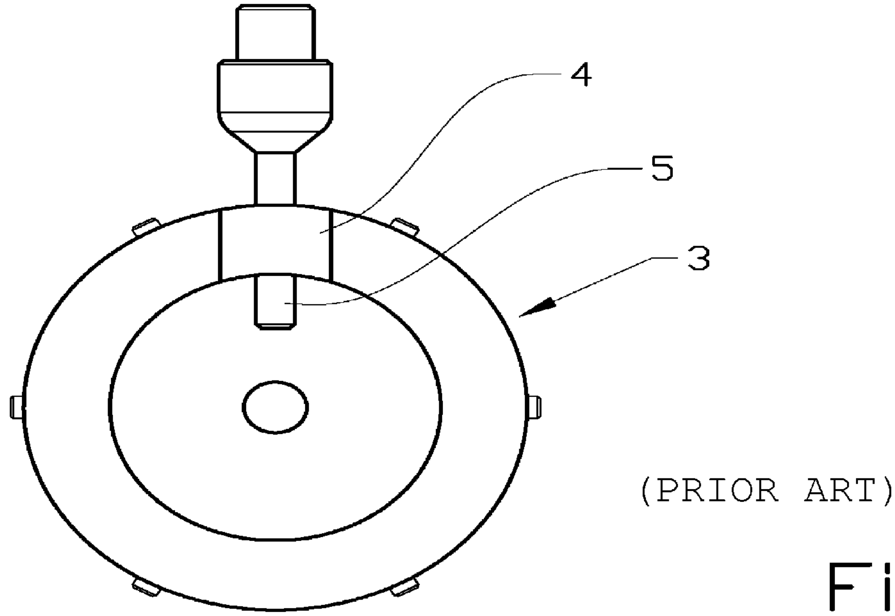
FIG. 2 is an end view of the device shown in FIG. 1.
Figure 8:
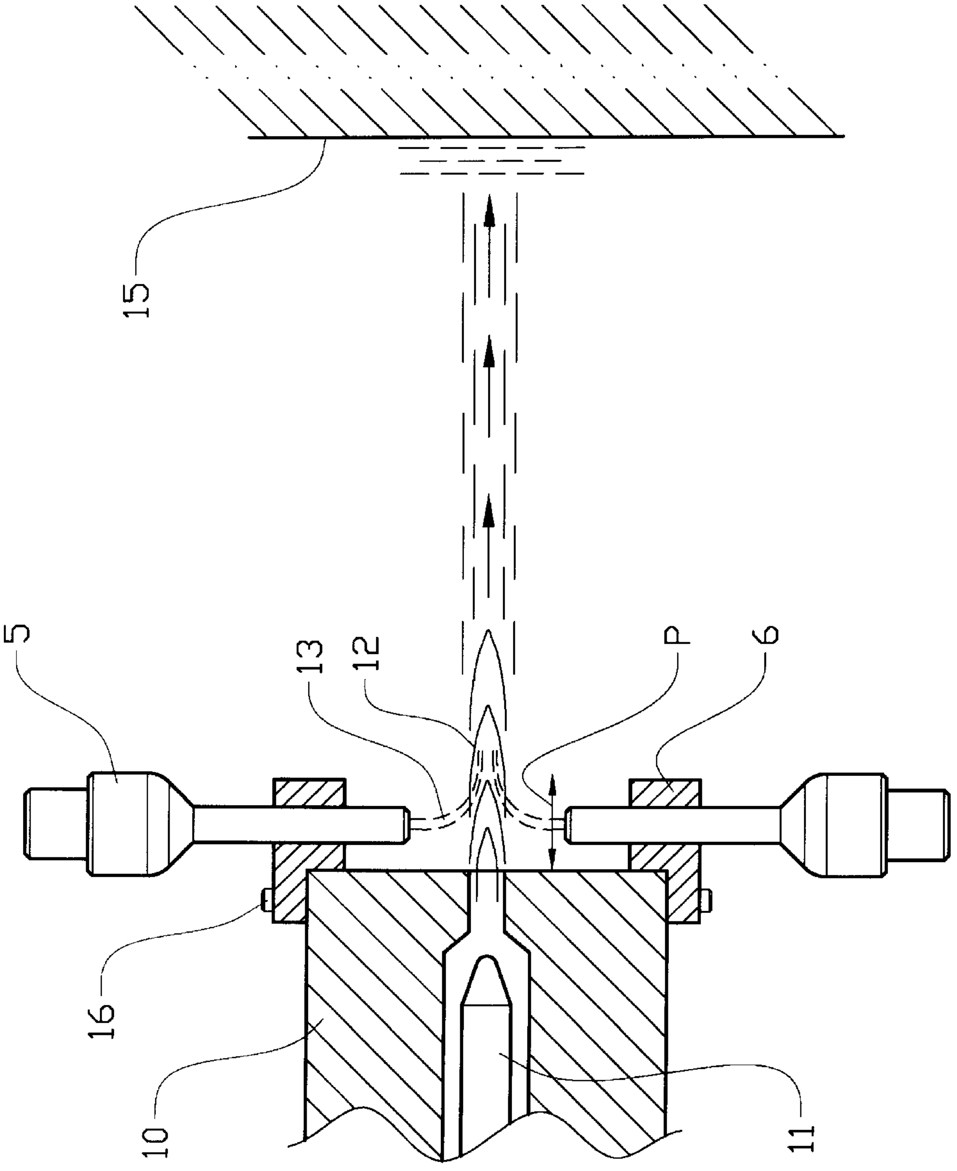
FIG. 8 is schematic view, shown in partial cross section depicting a plasma spraying device configured according to the present invention in operation.

FIGS. 1 and 2 show an end piece 1 of a thermal spraying device, more precisely a plasma spraying device, of conventional design. The device comprises means 2 for generating a flame; as illustrated, a plasma jet. Such means includes a cathode and an anode as depicted in FIG. 8 that is arranged in a conventional way and that defines an annular path therebetween. It also includes a means 3 for injecting a powder into the plasma jet.

The end piece 1 includes a tube with a circular cross section and which can also include the anode. The powder injection means 3 comprises a shoulder or knob 4 attached to the end piece 1. The shoulder or knob 4 includes a radial hole penetrated by a powder injection nozzle 5 that defines a port for powder injection towards the flame.

FIG. 2 indicates how only a small part of the flame is actually taken advantage of upon injection from the single nozzle 5 in the conventional arrangement. Due to the small angular sector covered by the shoulder or knob 4, a backstream of returning partly melted powder will be generated, resulting in unwanted build up on the nozzle 5.

Figure 3:
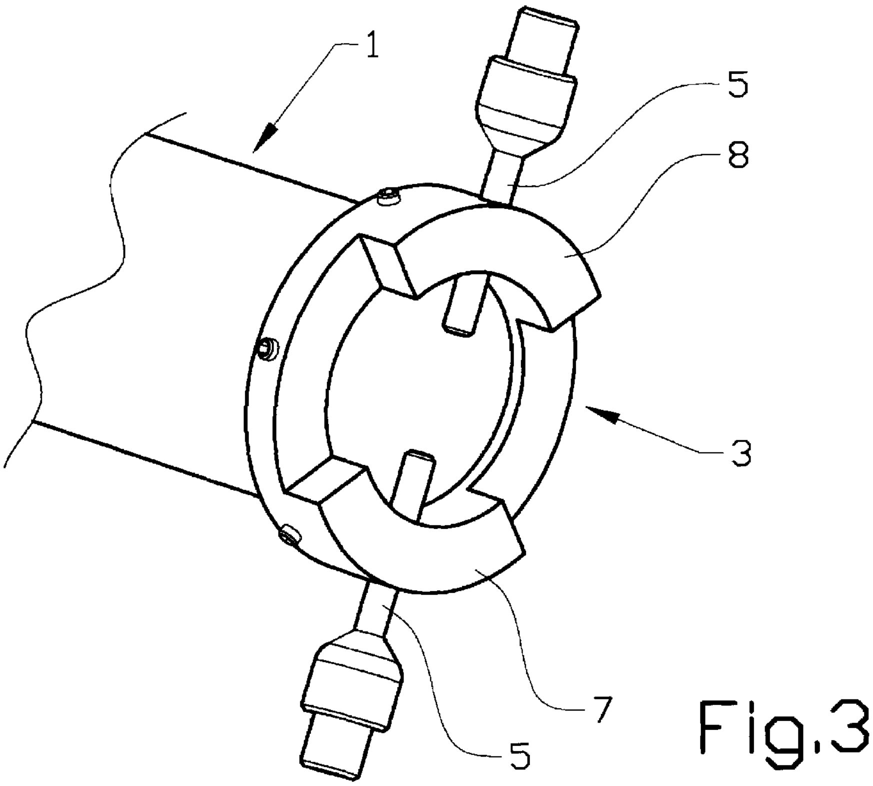
FIG. 3 is a perspective view of a one embodiment of a device configured partly according to FIG. 1, but provided with a powder injection means that comprises two opposite nozzles arranged on a frame element formed by two discrete ring parts.
Figure 4:
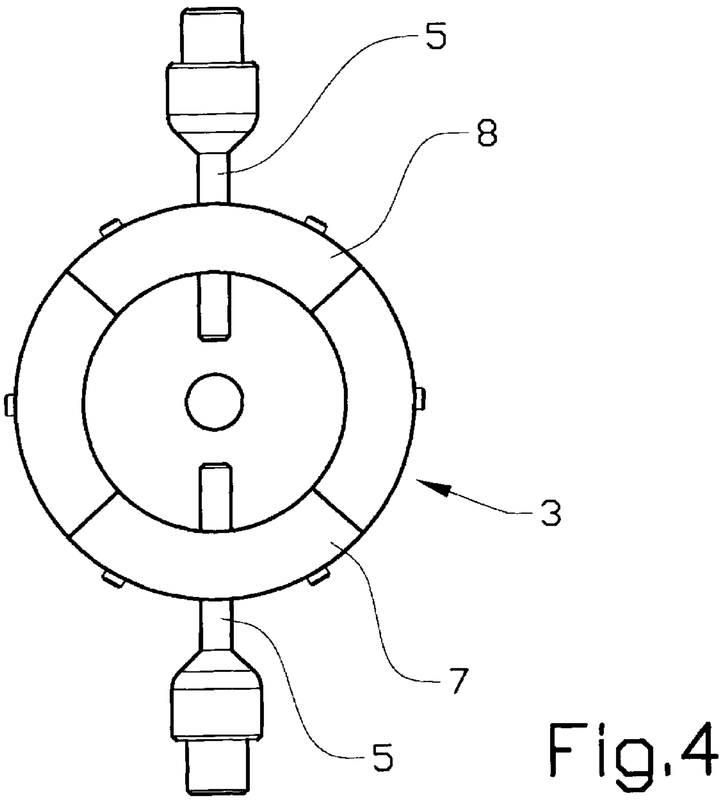
FIG. 4 is an end view of the device of FIG. 3.

FIGS. 3 and 4 show a first embodiment of a thermal spraying device configured according to the invention. A flame, or plasma jet is generated by the same means as described in FIGS. 1 and 2. A frame element 6 formed by two discrete ring parts 7, 8 covers approximately 180 degrees of a circumference around the flame. In other words, it covers 50 percent of the circumference that a corresponding continuous ring would have covered. Here, each ring part 7, 8 defines a sector that covers at least 90 degrees of the circumference.

The frame element 6 projects and extends the end piece 1 in the longitudinal direction thereof, which is the same as the flame direction. Each ring part 7, 8 is provided with one or more radial holes, at least one of which is penetrated by a powder injection nozzle 5. Each nozzle 5 can be arranged and directed as described earlier for the traditional nozzle depicted in FIGS. 1 and 2. Because of the double nozzle arrangement and the presence of the frame element 6, the tendency of having powder back-flow is suppressed and a more stable and better-used plasma jet is achieved. Accordingly, a higher powder yield is achieved as compared to traditional configurations.

Figure 5:
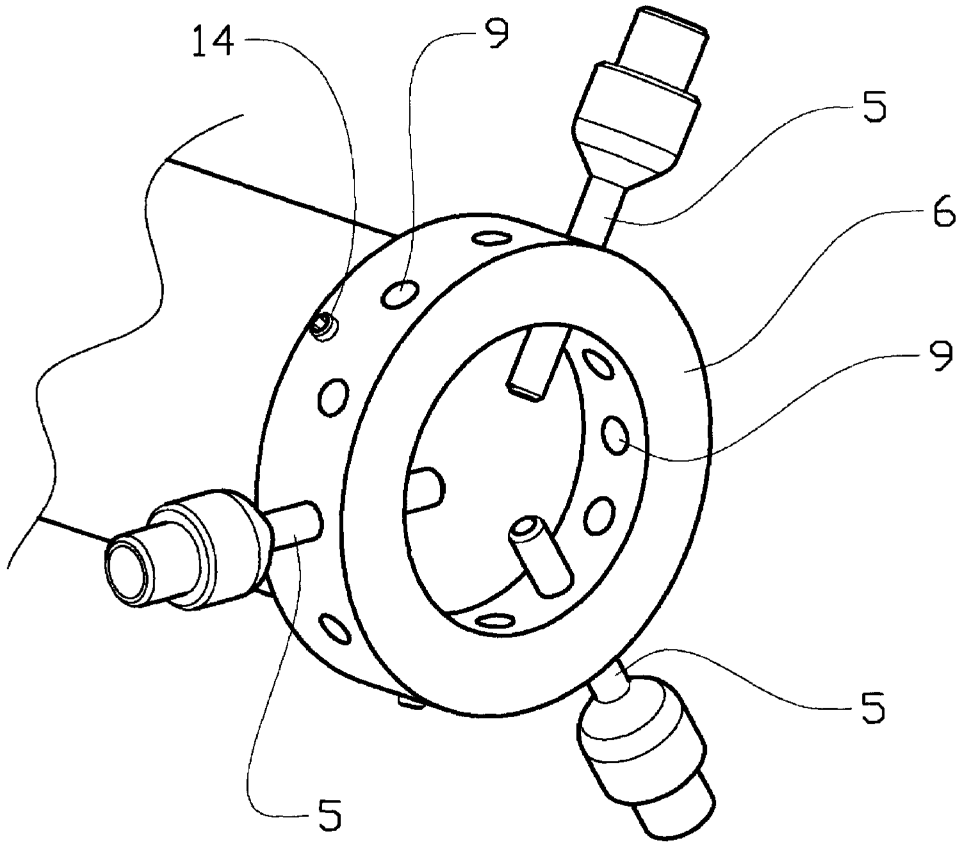
FIG. 5 is a perspective view of another embodiment of a thermal spraying device configured according to the teachings of the present invention.
Figure 6:
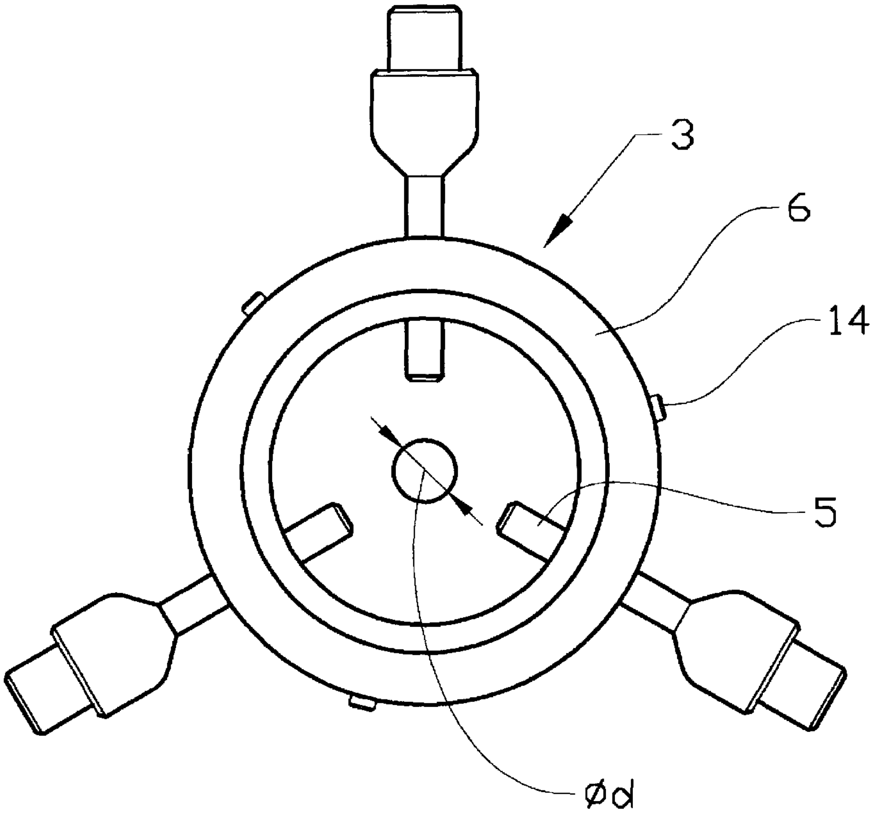
FIG. 6 is an end view of the device of FIG. 5.
Figure 7:
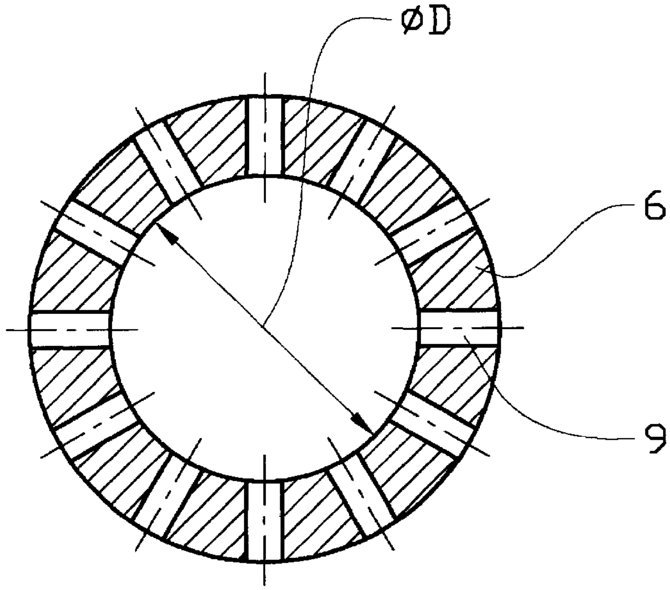
FIG. 7 is a cross sectional view of the frame element illustrated in FIGS. 5 and 6.

In FIGS. 5-7, another preferred embodiment of a device is presented. The device comprises means for generating a flame, preferably as described earlier with regard to FIGS. 1-4. It differs from the embodiment shown in FIGS. 3 and 4 in that it includes a frame element 6 formed by one single, continuous ring. The ring 6 is detachably attached to, and projects a distance p beyond the end of the end piece 1 in the plasma jet direction. The end piece 1 has an inner diameter d, and in which the relationship of 0.5 d<p<2 d, and preferably with d being approximately equal to p.

The ring 6 has a circular inner periphery with a diameter D that is approximately equal to the inner diameter d of the end peace 1. More precisely, as in the illustrated case, the inner diameter D corresponds to the outer diameter d of the end piece 1, plus the thickness of the wall of the end piece 1.

The frame element 6 further comprises a plurality of radial through holes 9 evenly distributed around the periphery of the projecting part thereof. At least some of the holes 9 are provided with a thread for engagement with a powder injection nozzle 5 that can be accommodated therein. Alternatively, a separate set of holes that can be in line with the holes 9 can be arranged to act as nozzle accommodation holes or powder ports.

The holes 9 are generally in line with each other around the inner periphery of the ring 6. The holes that do not accommodate a powder injection nozzle 5 contribute to a radial communication between the interior and exterior sides of the ring. Normally, the exterior faces an air atmosphere and the holes 9 act as air-cooling holes that further stabilize the jet and counteract powder back-flow towards the nozzles 5.

Preferably, the nozzles (or powder ports) are evenly distributed (at the same angular distance from each other) around the inner periphery of the frame element 6. The number of nozzles 5 may vary, but computer simulations have been utilized to determine that three nozzles is preferred, resulting in a advantageous powder yield (low loss of powder) and stable flow conditions.

In order to be easily attached to, and detached from the end piece 1, the powder injection means 3, here the frame element 6, is adapted to be pulled onto the end of the end piece 1 and fixed in position by means of fixation screws 16. Other connection means, such as clamps and the like can be alternatively used.

An exemplary plasma spraying device configured according to the invention is schematically shown in FIG. 8. The device comprises an anode 10 surrounding a central cathode 11 and that forms a nozzle or annular passage for gases; this kind of device being well known and therefore not described in further detail. An electric arc or plasma jet 12 is generated by means of controlling the voltage difference between the anode 10 and the cathode 11, and letting gases flow through the nozzle. According the invention, the device further comprises a means 3 for introducing a stream of powder particles 13 into the plasma jet 12. The jet 10 is directed towards a substrate 15 and will transport the powder particles 13 towards the substrate 15, while at the same time at least partly melting the particles 13.

A particular advantage of the invention is that a frame element 6 configured as described above can be used to replace the single shoulder and nozzle arrangement of traditionally configured plasma jet guns that are currently available on the market and which are typified by such products as the F4 gun. Adaptation according to the teachings of the present invention can be accomplished without extensive work and resulting in improved powder yield, improved plasma jet efficiency and stability, and diminishes the risk of powder port clogging.

It should be realized that the above presentation of the invention has been made by way of example, and that alternative embodiments will be obvious to those persons skilled in the relevant art. The scope of protection claimed is defined by the claims supported by the description and the annexed drawings.

The invention claimed is:

1. A thermal spraying device comprising:

a flame-generating means (1,2) for generating a flame and an injection means (3) for injecting a powder into the generated flame;

said flame-generating means (1,2) comprising an end piece (1) out of which the flame is directed towards a substrate to be subjected to spraying; and said powder-injection means (3) comprising a frame element (6) that projects in the flame ejection direction beyond the end piece (1);

wherein the frame element (6) at least partly surrounds a flame zone extending from the end piece (1) and has 1) a plurality of radially oriented open through holes (9) extending through the frame element (6) from an outer surface thereof to an inner surface thereof and distributed circumferentially about the frame element (6); and 2) two or more radially inwardly oriented powder injection ports distributed about the frame element (6).

2. The thermal spraying device as recited in claim 1, wherein the frame element (6) covers at least 90 degrees of a circumference around the flame zone extending from the end piece (1).

3. The thermal spraying device as recited in claim 1, wherein the frame element (6) covers at least 180 degrees of a circumference around the flame zone extending from the end piece (1).

4. The thermal spraying device as recited in claim 1, wherein the frame element (6) covers at least 270 degrees of a circumference around the flame zone extending from the end piece (1).

5. The thermal spraying device as recited in claim 1, wherein the frame element (6) has an inner periphery having a cross-section shape corresponds to the cross-section shape of the inner periphery of the end piece (1).

6. The thermal spraying device as recited in claim 1, wherein the frame element (6) defines a ring-shaped element.

7. The thermal spraying device as recited in claim 1, wherein there are greater than ten radially oriented open through holes (9).

8. The thermal spraying device as recited in claim 1, wherein the plurality of radially oriented open through holes (9) are evenly distributed around a periphery of the frame element (6).

9. The thermal spraying device as recited in claim 1, wherein the end piece (1) has an inner diameter d and the frame element (6) has a projection distance p, and $0.5\ d<p<6\ d$.

10. The thermal spraying device as recited in claim 1, wherein the end piece (1) has an inner diameter d and the frame element (6) has a projection distance p, and $0.5\ d<p<2\ d$.

11. The thermal spraying device as recited in claim 1, wherein the end piece (1) has an inner diameter d and a projecting part of the frame element (6) has a corresponding inner diameter D in which is at least as great as d.

12. The thermal spraying device as recited in claim 1, wherein the end piece (1) has an inner diameter d and a projecting part of the frame element (6) has a corresponding inner diameter D approximately 1.2 times as great as d.

13. The thermal spraying device as recited in claim 1, wherein the plurality of powder injection ports (5) are evenly distributed around the inner periphery of the frame element (6).

14. The thermal spraying device as recited in claim 1, wherein each of the plurality of powder injection ports (5) further comprises a nozzle inserted in a radial opening through the frame element.

15. The thermal spraying device as recited in claim 1, wherein the frame element (6) is detachably attached to the end piece (1).

16. The thermal spraying device as recited in claim 1, wherein the flame generated by the flame-generating means is a plasma jet.

* * * * *